United States Patent [19]
Jones et al.

[11] Patent Number: 5,905,888
[45] Date of Patent: May 18, 1999

[54] BOOTABLE REDUNDANT HARD DISK ATTACHED TO A PC'S PARALLEL PORT WITH ROM-ADDRESS AUTO-DETECT AND CONFIGURE DURING BIOS SCAN

[75] Inventors: Larry Lawson Jones, Palo Alto; Sreenath Mambakkam, San Jose; Arockiyaswamy Venkidu, Menlo Park, all of Calif.

[73] Assignee: On Spec Electronic, Inc., Santa Clara, Calif.

[21] Appl. No.: 08/802,133

[22] Filed: Feb. 19, 1997

[51] Int. Cl.$^6$ .............................. G06F 9/00; G06F 9/40; G06F 9/44; G06F 9/46
[52] U.S. Cl. ........................ 395/652; 395/309; 395/733; 395/182.22; 395/741; 395/833; 711/1; 711/114
[58] Field of Search ...................... 395/115, 652, 395/182.03, 182.04, 182.09, 182.11, 183.18, 183.19, 185.09, 200.83, 281, 282, 306, 822, 891, 284, 828, 833, 591, 182.05, 183.11, 728–732, 851, 856–862, 821, 800.04, 566, 567, 580, 581, 587, 670–678, 733–742, 741, 310, 590; 711/114

[56] References Cited

U.S. PATENT DOCUMENTS

| | | | |
|---|---|---|---|
| 5,109,505 | 4/1992 | Kihara ........................................ | 395/575 |
| 5,325,529 | 6/1994 | Brown et al. ............................. | 395/700 |
| 5,325,532 | 6/1994 | Crosswy et al. ......................... | 395/700 |
| 5,390,321 | 2/1995 | Proesel .................................... | 395/500 |
| 5,418,918 | 5/1995 | Vander Kamp et al. ................. | 395/375 |
| 5,430,845 | 7/1995 | Rimmer et al. ......................... | 395/275 |
| 5,446,855 | 8/1995 | Dang et al. .............................. | 395/401 |
| 5,446,877 | 8/1995 | Liu et al. ................................. | 395/180 |
| 5,448,731 | 9/1995 | Wang et al. ............................. | 395/650 |
| 5,448,741 | 9/1995 | Oka ......................................... | 395/700 |
| 5,452,454 | 9/1995 | Basu ........................................ | 395/700 |
| 5,457,785 | 10/1995 | Kikinis et al. ........................... | 395/308 |
| 5,463,766 | 10/1995 | Schieve et al. .......................... | 395/650 |
| 5,487,160 | 1/1996 | Bemis ...................................... | 395/441 |
| 5,535,381 | 7/1996 | Kopper .................................... | 395/600 |
| 5,551,006 | 8/1996 | Kulkarni .................................. | 395/473 |
| 5,572,688 | 11/1996 | Sytwu ..................................... | 395/309 |
| 5,613,074 | 3/1997 | Galloway ................................. | 395/280 |
| 5,628,027 | 5/1997 | Belmont .................................. | 395/821 |

*Primary Examiner*—Ayaz R. Sheikh
*Assistant Examiner*—Tim T. Vo
*Attorney, Agent, or Firm*—Stuart T. Auvinen

[57] ABSTRACT

An external hard disk is connected to a personal computer (PC) through the parallel port. A parallel-port expansion card is installed on the AT bus in the PC for communicating with the external hard disk. The parallel-port expansion card has a ROM containing intercept code. The address of the ROM is automatically configured when the system BIOS scans for expansion ROMs during booting. When no other ROM drives the data bus when an address is scanned, the parallel-port card latches the address and has the ROM drive its data onto the bus. Future accesses to the latched address access the ROM. The ROM's code replaces the interrupt table's starting address of the hard-disk-controller routine with the address of an intercept routine. All hard-disk operations using the interrupt first execute the intercept routine. The intercept routine copies any data writes to the external disk. Thus the external disk has a redundant copy of the PC's internal hard disk. The external hard disk can be the boot disk by having the intercept routine route all disk reads and writes to the external disk any not pass any disk operations through to the PC's internal hard disk.

18 Claims, 8 Drawing Sheets

BOOTABLE REDUNDANT HARD DISK ATTACHED TO A PC'S PARALLEL PORT WITH ROM-ADDRESS AUTO-DETECT AND CONFIGURE DURING BIOS SCAN

BACKGROUND OF THE INVENTION

1. Field of the Invention

This invention relates to Personal Computers (PC's), and more particularly to adapters for connecting a redundant disk to the Parallel Port of a PC.

2. Description of the Related Art

Personal computers (PC's) are a vital part of most businesses today. While larger companies often use large mainframes for critical data, smaller firms often use inexpensive PC's even for critical data. The cost of PC's have fallen so much that the firm's data stored on the PC can be more valuable than the PC itself. Customer lists, work in progress, commercial and proprietary software are some examples.

The mantra of the expert's advice to these firms is "backup, backup, backup." Tape drives for backing up the PC's data are commonly used today to offer a degree of protection from data disaster. Unfortunately, these tape drives are slow in comparison to the hard-disk drives the primarily store the data, and users may perform a backup of their data only once a day, week, or month. The user often has to run specialized backup software, or a network administrator has to set up a backup schedule for networked PC's.

Redundant hard-disk drives are becoming increasingly popular, since data is backed up to the redundant hard disk immediately each time data is written to the primary hard disk. Thus no data is lost. However, these redundant disk arrays (RAID) are typically difficult to install, being mounted inside the PC's chassis. RAID disks installed inside the PC's chassis are not easily transportable. The complexities of installing a RAID disk in a PC can discourage many potential users.

Disks can also be installed outside of the PC's chassis. One desirable feature of PC's are the industry-standard busses and communication ports, allowing easy expansion by the end user. Early PC's had a serial port and a parallel port, usually located on the rear panel of the chassis. The serial port was used to communicate data in a serial fashion to external devices such as modems and mice, while the parallel port was used to communicate 8 bits of data in parallel to a printer. The connection of an external printer to the parallel port is so common that it is also known as the printer port.

The types and number of external devices that connect to the serial and parallel ports of a PC has grown over the years. While once just a printer was attached to the parallel port, now many users have two printers—a high-quality laser printer and a draft-mode dot-matrix printer. Other devices have also appeared that connect to the parallel port. These devices include external disk drives, tape drives, CD-ROM drives, and local-area network adapters. Data transfer in a portable PC such as a Laptop or Notebook can occur over a special cross-wired serial or parallel cable that connects a desktop PC to the portable PC.

Disks attached to the PC's parallel port are common today, but they operate as an additional disk drive rather than as a redundant disk drive. These disks do not mirror the writes to the PC's internal hard disk and thus do not provide redundancy. Standard PC software drivers and BIOS do not provide for redundancy. Configuring the parallel port and disk is complex because addresses and interrupts may have conflicts with other expansion devices on the PC. Often jumpers are used to select the addresses or interrupts for an expansion card.

When the primary disk fails, the PC must be re-started or booted from another disk. Often the removable diskette or floppy disk drive is used. When the data is backed up to the disk on the parallel port, the software driver for the parallel-port disk must also be loaded to memory, perhaps requiring that the boot diskette be swapped out for the parallel-port driver diskette. Swapping diskettes is undesirable, and the diskettes are easy to lose.

It is thus desirable to boot the computer from a hard disk on the parallel port. It is especially desirable to boot the PC from a redundant disk on the parallel port. It is desired to automatically mirror writes to the primary hard disk to the parallel-port disk so that the parallel-port disk is a fully redundant back-up disk. It is further desired to automatically configure the address of the parallel-port controller.

SUMMARY OF THE INVENTION

A parallel-port adapter card is for installation on an expansion bus on a personal computer (PC). The expansion bus has a host data bus and a host address bus. The parallel-port adapter card has a connector that connects to a parallel cable. A control register is coupled to the host data bus, for driving control signals to the connector. A data register sends and receives data signals from the connector. A status register on the host data bus receives status signals from the connector.

A read-only-memory (ROM) transmits ROM code to the host data bus on the expansion bus. The ROM code includes table read means for reading a disk-interrupt starting address from an interrupt table. The disk-interrupt starting address points to a disk service routine for accessing a hard disk. A table write means over-writes the disk-interrupt starting address in the interrupt table with an intercept starting address. The intercept starting address points to a parallel-port service routine for writing to the data register and the control register. Thus the parallel-port adapter card has the ROM containing ROM code for over-writing the disk-interrupt starting address in the interrupt table.

In further aspects of the invention the parallel-port service routine includes a means for writing disk data to the data register for transmission through the connector over the parallel cable to an external redundant hard disk. A return means is for returning program control to the disk service routine. The disk service routine then writes the disk data to the hard disk. Thus the external redundant hard disk is written with a copy of the disk data written to the hard disk when a program writes to the hard disk using the interrupt table. The disk-interrupt starting address which is over-written in the interrupt table is a starting address for interrupt 13. The ROM code is activated by a system BIOS residing in a system ROM in the PC during a booting sequence.

In other aspects a ROM-address latch stores a ROM address. The ROM transmits the ROM code when the ROM address is transmitted on the host address bus. Default-data detect means is coupled to the host data bus. It activates a latch signal when no active devices are driving the host data bus during a scan cycle. The latch signal is coupled to store address bits from the host address bus into the ROM-address latch. The address bits determine the ROM address. Thus the ROM address is latched when no active devices are driving the host data bus during a scan cycle.

In still further aspects the scan cycle is a read cycle in an expansion ROM area between addresses C8000 and DFFFF hex.

DETAILED DESCRIPTION

The present invention relates to an improvement in parallel-port disk adapters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Parallel Port on a PC

The parallel port in a PC is described in more detail in U.S. Pat. No. 5,293,497, Issued to Gordon Free and assigned to Traveling Software of Bothell Wash. The parallel port uses a 25-pin D-type connector, and has 17 data and signal lines with the remaining 8 lines being ground.

The 17 signals include 8 data bits, 5 status lines and 4 control signals. In the original parallel port, the 8 data lines are sent from the PC to the printer, while the 5 status signals are received from the printer. The 4 control signals are also from the PC. A simple handshake is used where the PC outputs the data and raises a strobe control signal. Data is left on the parallel port data line until the printer responds by activating the acknowledge (ACK) status signal. Other handshakes have been devised to speed up the data transfer. For instance, the auto line-feed AFD signal is often used as a timing signal to indicate when to latch data from the parallel cable. Table 1 shows the signals in the parallel port and their function.

TABLE 1

| Parallel Port Signals | | |
|---|---|---|
| Type | Function | Pin Number |
| Data | bit 0 | 2 |
|  | bit 1 | 3 |
|  | bit 2 | 4 |
|  | bit 3 | 5 |
|  | bit 4 | 6 |
|  | bit 5 | 7 |
|  | bit 6 | 8 |
|  | bit 7 | 9 |
| Control | Strobe | 1 |
|  | Auto Line Feed | 14 |
|  | Initialize | 16 |
|  | Select Printer/Device | 17 |
| Status | Acknowledge | 10 |
|  | Busy | 11 |
|  | Paper Out | 12 |
|  | On-Line | 13 |
|  | Error | 15 |

The signals in the parallel port are divided into three types: data and control from the PC, and status from the printer or other external device. These three divisions each have an I/O register within the PC. Many of the control and status signals are active-low signals rather than active-high signals. Active-low signals have better noise immunity for TTL-voltage-level signals that are commonly used in PC's.

Parallel-Port Hardware

Figure 1:
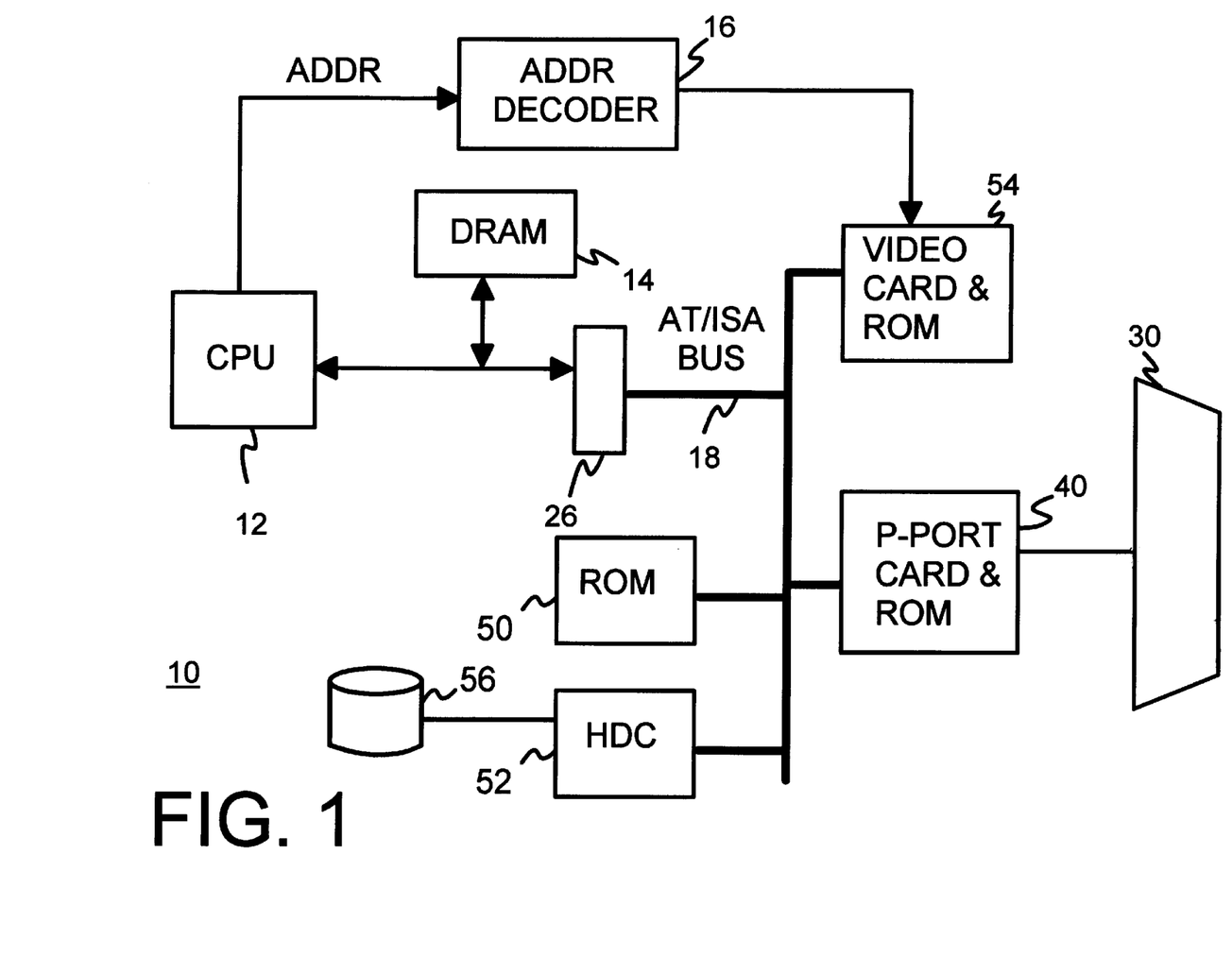
FIG. 1 is a diagram of a PC with a parallel-port card installed.
Figure 2:
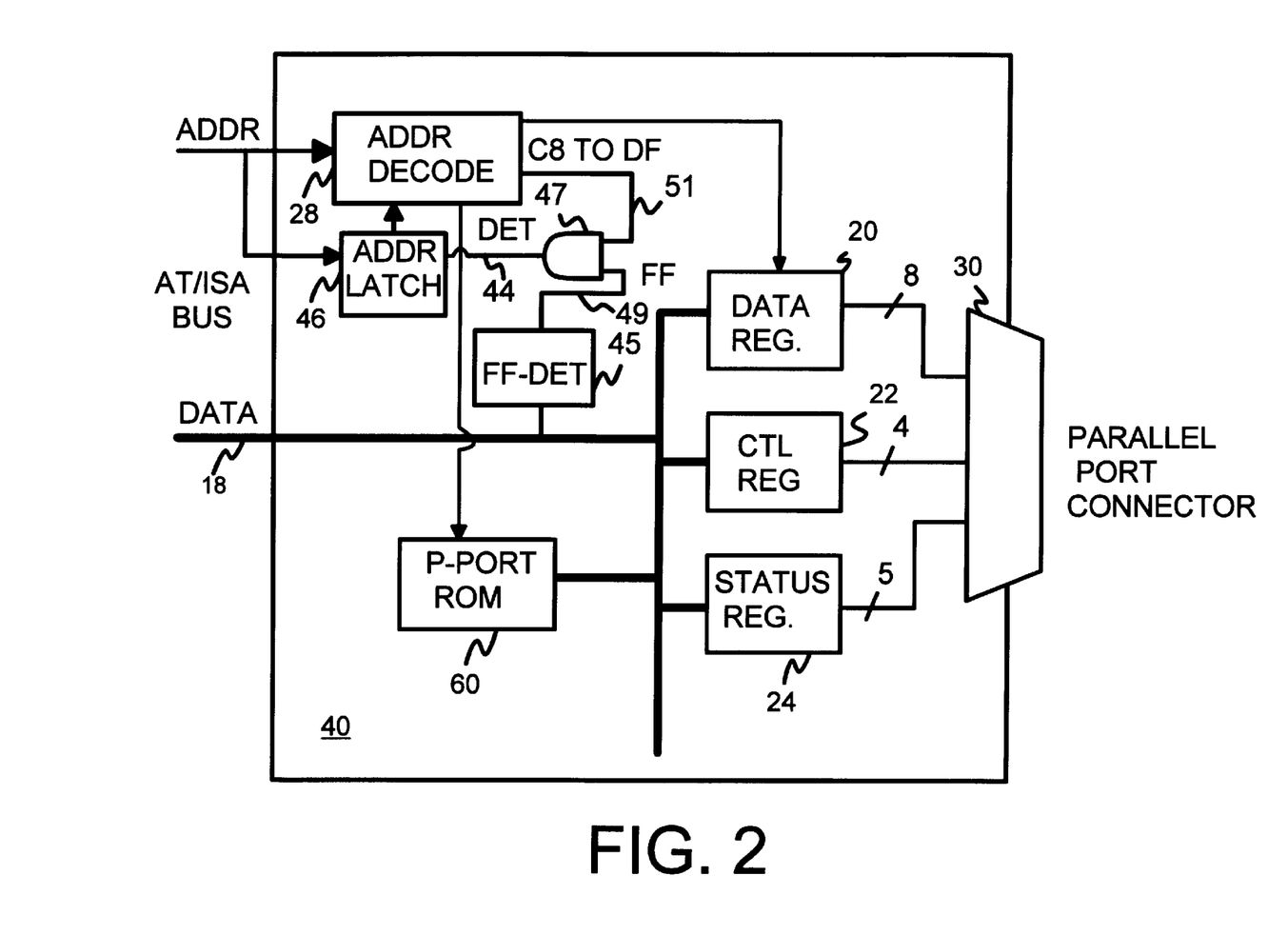
FIG. 2 shows a parallel-port AT-bus card with a ROM for initializing the parallel port to intercept writes to the PC's hard disk.
Figure 3:
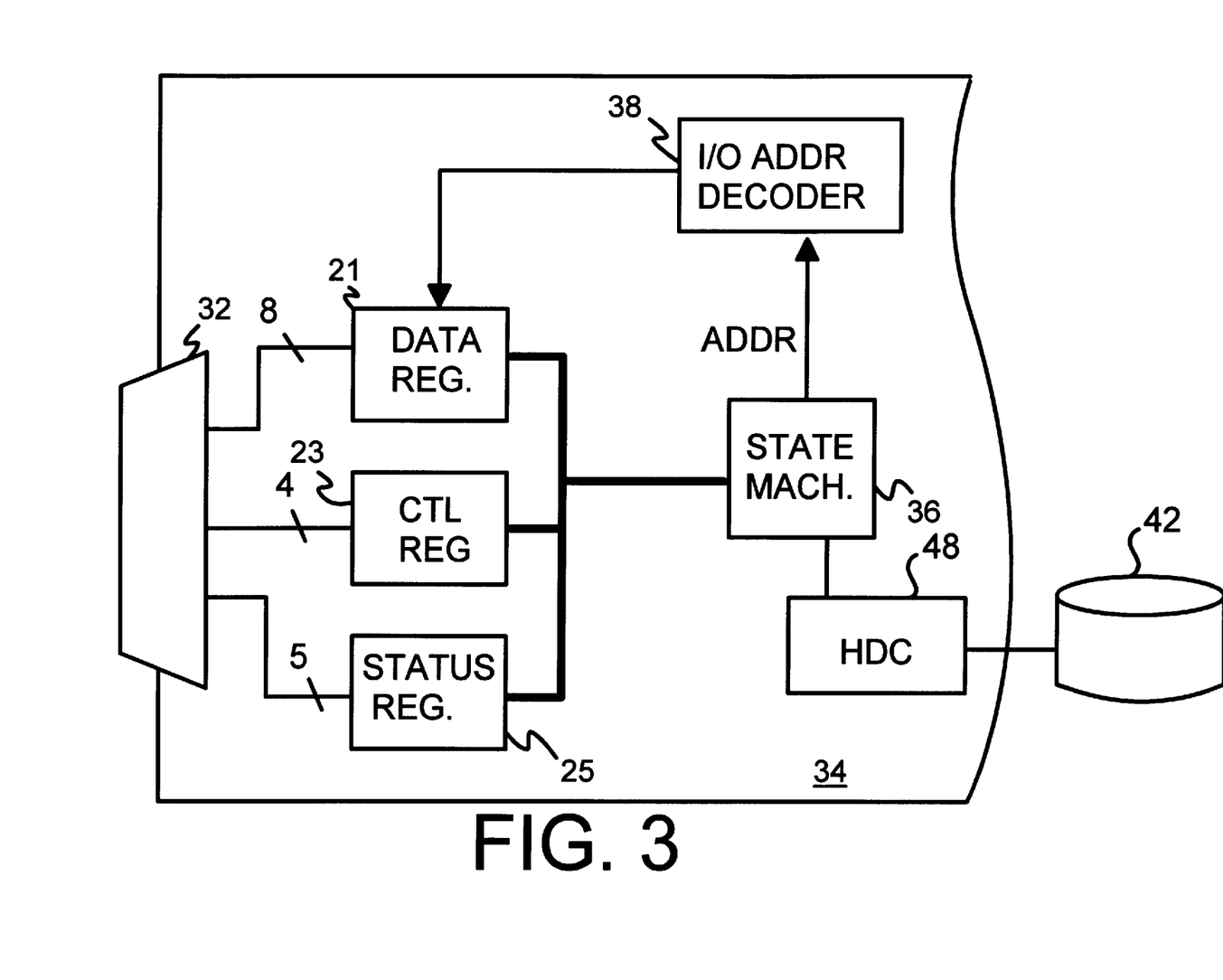
FIG. 3 is a diagram of an external disk controller connected to a PC through the parallel port.

FIGS. 1–3

FIG. 1 is a diagram of a PC with a parallel-port card installed. PC 10 has a central processing unit (CPU) 12 which executes instructions stored in main memory 14 or in ROM 50. Buffer 26 separates the main memory 14, usually DRAM, from the industry-standard (ISA) bus, also known as the AT bus 18. This expansion bus typically has expansion slots so that end users can add AT expansion boards to upgrade or enhance their PC. Decoder 16 receives addresses from CPU 12, either directly or more commonly through address buffers (not shown). Decoder 16 generates select signals and possibly timing signals so that data may be written to or from parallel port I/O registers on parallel-port card 40. These I/O registers include a data register, control register, and status register. These I/O registers connect to parallel port connector 30, which is usually mounted on the back panel of the PC's chassis.

ROM 50 contains the system basic input/output system (BIOS), which is the low-level code executed by CPU 12 immediately after power is applied or PC 10 is reset or rebooted. The system BIOS code in ROM 50 is normally copied to main memory 14.

Hard-disk controller (HDC) 52 controls fixed or hard disk 56 mounted in the chassis of PC 10. HDC 52 is often integrated with controllers for other peripherals in a universal-peripheral-controller chip, and can be mounted on the motherboard or on an expansion card plugged into AT bus 18. Video card 54 is connected to transfer display information such as pixels to a display. Video card 54 contains a video ROM which has the video BIOS code to initialize the display and perform other low-level graphics functions.

ROM 50 and hard-disk controller 52 may be buffered from AT bus 18 and actually reside on a derivative bus.

Address decoder 16 generates select signals to enable ROM 50 and possibly HDC 52 or video card 54. Address decoding may be performed directly on the AT expansion cards which receive address bits from CPU 12.

FIG. 2 shows a parallel-port AT-bus card with a ROM for initializing the parallel port to intercept writes to the PC's hard disk. AT bus 18 connects to data register 20, control register 22, and status register 24 which receive and drive signals in parallel-port connector 30. Data buffers may also be used on AT bus 18. Parallel-port card 40 also contains parallel-port ROM 60, which drives "data" onto AT bus 18. The "data" driven by ROM 60 are instructions being fetched for execution by CPU 12 of FIG. 1 as is explained later. These instructions from parallel-port ROM 60 are executed during system initialization or boot-up to configure the PC to use an external hard disk on the parallel port.

Addresses from the AT bus are also received by parallel-port card 40 installed on the AT bus. These addresses are decoded by decoder 28, which generates select control signals to enable reading of parallel-port ROM 60, and reading and writing of data register 20, control register 22, and status register 24.

The AT-bus addresses which activate parallel-port ROM 60 vary for different PC's, depending on other expansion cards installed on AT bus 18. An automatic detection of other devices and the addresses they use is performed by parallel-port card 40. This automatic detection reads the data on AT bus 18 during system BIOS initialization. Address decoder 28 determines when the system BIOS is scanning a pre-determined address range reserved for use by expansion cards. For PC's, this address range is C8000 to DFFFF (Hexadecimal). When no other AT expansion cards use a scanned address, then no data is driven onto AT bus 18, and the default data of "FF" hex is left on AT bus 18. The default data is "FF" hex when no devices drive data to AT bus 18 because pull-up resistors are connected to AT bus 18. Detector 45 activates FF signal 49 when AT bus 18 contains "FF". When the address is in the predetermined range, and at a certain time in a valid cycle, decoder 28 activates C8TODF signal 51. AND gate 47 activated DET signal 44 when both C8TODF signal 51 and FF signal 49 are active. DET signal 44 then causes latch 46 to latch in the AT-bus address.

Latch 46 then contains the configured address which reads from parallel-port ROM 60. Future reads to the address latched in latch 46 read from ROM 60. Latch 46 can contain only a few address bits so that a range of addresses read from ROM 60.

External Parallel-Port Disk Controller

FIG. 3

FIG. 3 is a diagram of an external disk controller connected to a PC through the parallel port. One end of a parallel cable is plugged into connector 30 on the parallel-port card 40 installed in PC 10 of FIG. 1. The other end of the cable is plugged into connector 32 on external parallel device 34. External parallel device 34 also contains a data register 21, control register 23, and status register 25 which are connected through the parallel cable to the corresponding data register 20, control register 22, and status register 24 on parallel-port card 40 of FIG. 2. State machine 36 is used to provide control by executing routines in firmware that perform communication with the parallel port, and otherwise control external parallel device 34. State machine 36 provides a read/write indication to registers 21, 23, 25, and addresses to decoder 38, which decodes the addresses and selects a register for reading or writing.

Redundant hard-disk controller 48 receives read, write, and other commands from state machine 36 which are received from the PC through the parallel cable. Redundant disk 42 is read or written by redundant hard-disk controller 48 in response to these commands. These commands also include positioning commands such as seek which moves the recording head to a particular sector or track.

Operation of Redundant Disk on Parallel Port

Figure 4:
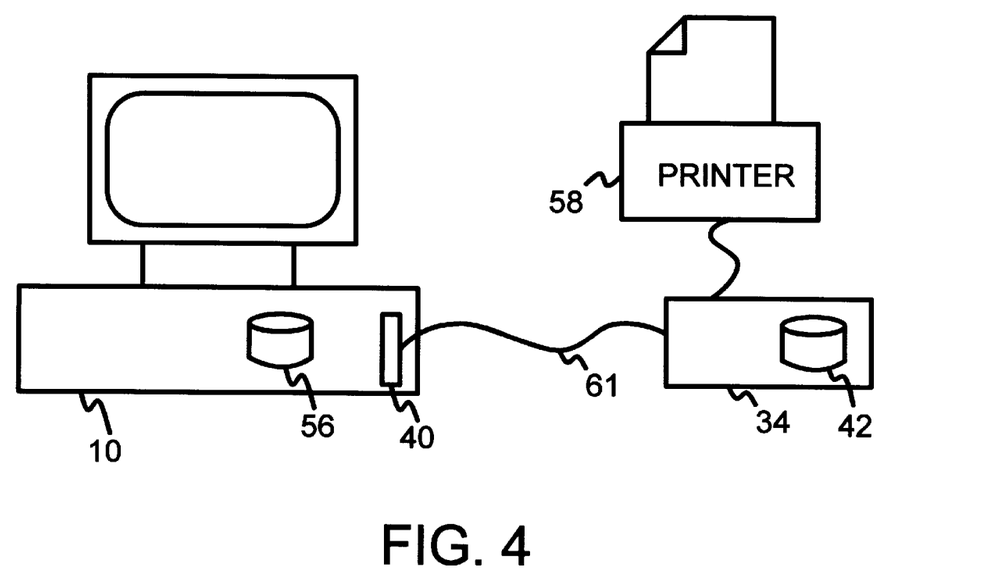
FIG. 4 illustrates a bootable, redundant hard disk attached to a PC through the parallel port.

FIG. 4 illustrates a bootable, redundant hard disk attached to a PC through the parallel port. PC 10 contains a primary hard disk 56, which contains the operating system files normally used to boot PC 10. Parallel-port card 40 is installed in the AT expansion bus in PC 10, and drives parallel cable 61. Cable 61 is also connected to external parallel device 34, which contains or is attached to redundant disk 42. Redundant disk 42 contains a complete copy of primary hard disk 56 in PC 10, even though disks 56, 42 are not both contained within the chassis of PC 10. Printer 58 or another parallel device may be connected though external parallel device 34.

Mirroring Writes to External Redundant Disk

Figure 5:
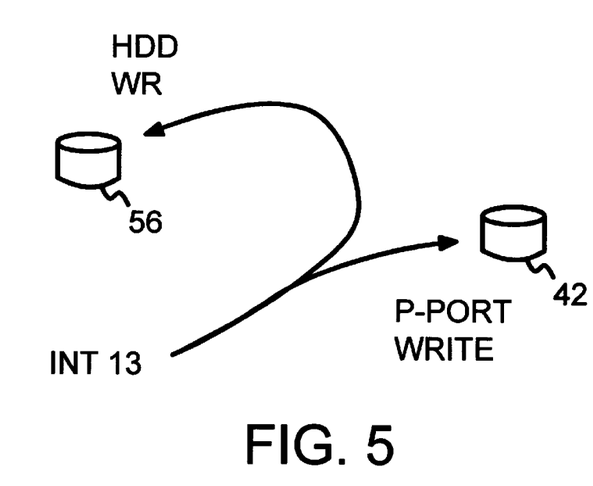
FIG. 5 illustrates that writes to the primary hard disk are mirrored to the redundant disk on the parallel port.

FIG. 5

FIG. 5 illustrates that writes to the primary hard disk are mirrored to the redundant disk on the parallel port. When a program desires to read or write a data file on a hard disk, the program uses an interrupt (or calls the operation system which then uses the interrupt). For PC's, the hard disk controller is assigned interrupt 13. Thus anytime interrupt 13 is called, an access of the hard disk is requested.

An interrupt service routine is called by the CPU. Each interrupt has a service routine which is called when that particular interrupt is needed. For example, a write to the parallel-port is requested by interrupt 17. An interrupt table is used to map each interrupt to a starting address for the interrupt's service routine.

Writes to primary hard disk 56 are performed by the interrupt service routine which has its starting address located in the interrupt table for interrupt 13. These disk writes can be intercepted by replacing the starting address for interrupt 13 in the interrupt table with a starting address of an intercept routine. The intercept routine first writes the redundant disk 42 by executing a series or writes to the parallel port. Then the intercept routine passes control back to the standard interrupt service routine for interrupt 13, allowing the data to be written normally to primary hard disk 56.

Thus writes to primary hard disk 56 can be intercepted by replacing the starting address for interrupt 13 with the starting address of the intercept routine. The intercept routine contains specialized code to re-format the write request to transmit over the parallel port so that the data can also be written to redundant disk 42.

Reserved Address Space for Expansion ROMs

Figure 6:
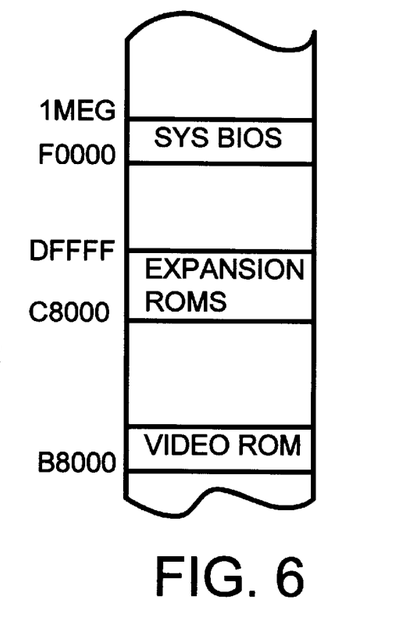
FIG. 6 illustrates a portion of the PC's address space containing the system BIOS and other ROMs.

FIG. 6

FIG. 6 illustrates a portion of the PC's address space containing the system BIOS and other ROMs. Personal computers have standardized where certain devices are to be found in the address space. The x86 microprocessors jump to address F0000 after a reset, so the booting code is located here. The system BIOS in ROM 50 of FIG. 1 is located at addresses F0000 to FFFFF hex. During the boot sequence, other specialized ROMs are accessed to initialize other parts of the PC. For example, the video BIOS in a video ROM on video card 54 of FIG. 1 is called by the system BIOS by fetching the instruction at address B8000 and transferring control to the video BIOS code at address B8000. The video BIOS then initializes the display system, allowing the system BIOS and other programs to display information to the screen using calls to the video BIOS.

Before the video BIOS was initialized, the size of the video ROM was returned to the system BIOS. After video BIOS initialization, the system BIOS scans for other expansion ROMs in address between the video ROM and the system BIOS. In particular, the address space between C8000 and DFFFF is reserved for expansion ROMs.

Booting Sequence Includes Scanning for ROMs

Figure 7:
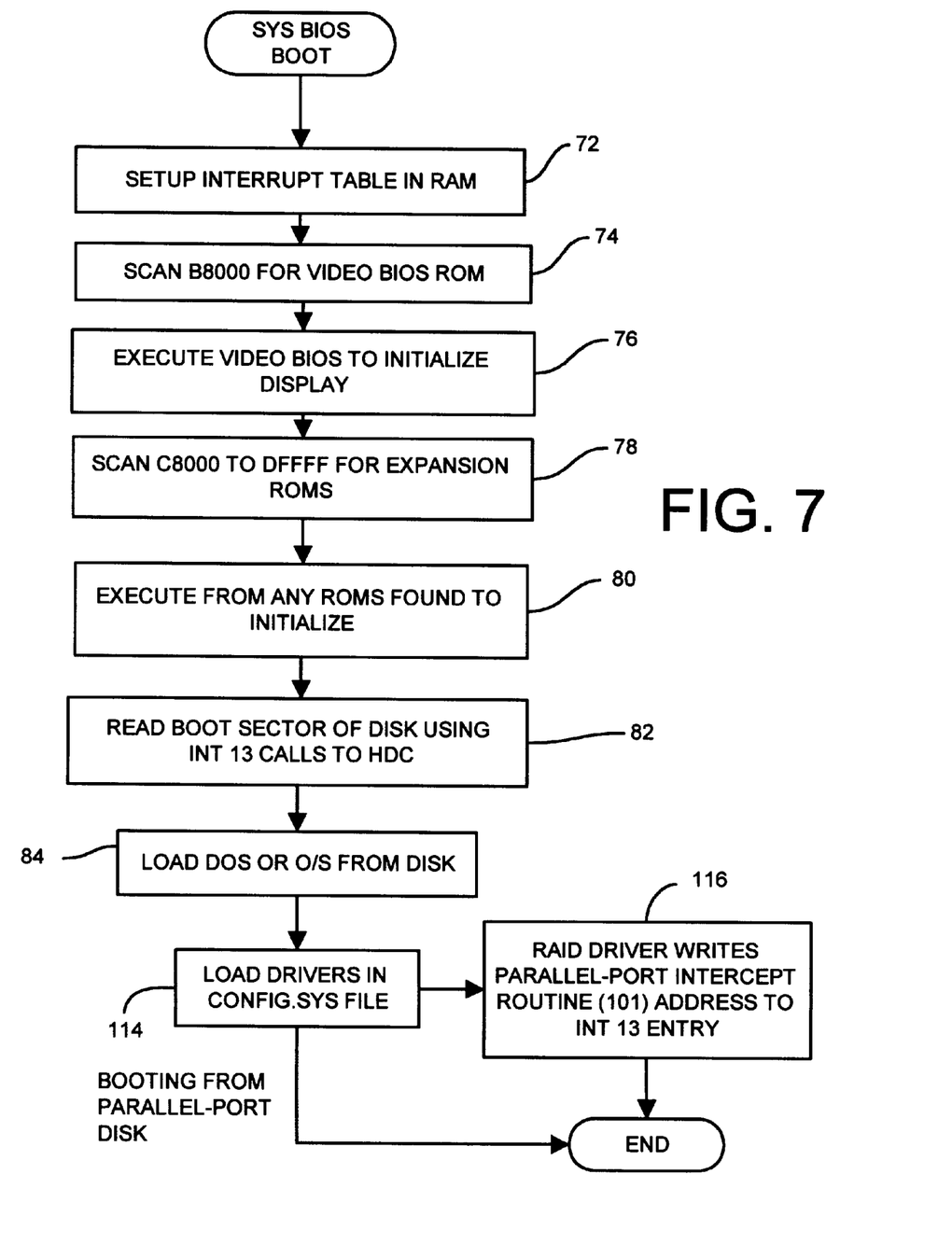
FIG. 7 is a flowchart of the booting sequence of a PC highlighting the scanning for ROMs.

FIG. 7

FIG. 7 is a flowchart of the booting sequence of a PC highlighting the scanning for ROMs. Many other steps are performed in a booting sequence which are not shown in FIG. 7 for clarity. The system BIOS is initially executed from ROM 50 of FIG. 1. Once the memory has been sized and checked for errors, a portion of main memory 14 is set aside for the operating system, and the interrupt table is constructed, step 72. The starting addresses of the various interrupt service routines are loaded into the corresponding entries in the interrupt table.

The system BIOS then locates the video BIOS by scanning address B8000, the standard location for the video BIOS, step 74. The first instruction of the video BIOS's initialization routine is fetched from address B8000. Control is thus transferred to the video BIOS code at address B8000. The video BIOS then initializes the display system, step 76, allowing the system BIOS and other programs to display information to the screen using calls to the video BIOS.

The size of the video ROM is returned to the system BIOS before the video BIOS has initialized. The system BIOS then scans for other expansion ROMs in address between the video ROM and the system BIOS, step 78. In particular, the address space between C8000 and DFFFF is scanned for expansion ROMs. Scanning is performed by reading addresses in this range for a standard header. The standard header is the data "55AA". When the system BIOS reads the data "55AA", an expansion ROM has been found. The data "55AA" was chosen because it contains alternating 1's and 0s and is unlikely to appear as a default value on a bus that is not driven, or by an un-initialized RAM.

The size of any expansion ROM is determined by the system BIOS. The system BIOS then resumes scanning addresses beyond the size determined for additional ROMs. Any ROMs found are executed, step 80, by fetching the first instruction in the ROM after the checksum or header and executing that instruction and the following instructions in the ROM.

The disk is checked for proper operation, and the boot sector is read from the primary disk, step 82. Interrupt 13 can then be used for accessing the hard disk. The operating system, such as DOS or a Windows kernel, is read from the primary hard disk and its critical components written to main memory, step 84.

DOS or the O/S reads the config.sys file on the boot disk and loads and drivers listed in the config.sys file to memory, step 114. When the parallel-port disk is the boot disk, the config.sys file is read from the parallel-port disk. However, when the internal disk is the boot disk, the config.sys file on the internal disk is read. When software detects that a boot has occurred from the parallel-port disk, the RAID software is not invoked.

During normal boots from the internal hard disk, the config.sys file contains a line instructing the O/S to load the RAID driver. The RAID driver is then initialized by executing an initialization routine from the hard disk. This RAID initialization routine writes the address of the RAID parallel-port shadow-write HDD intercept routine (101 of FIG. 9B), step 116. The operating system can then accept user commands such as running application programs.

Parallel-Port ROM Initialization or Write Intercept

Figure 8:
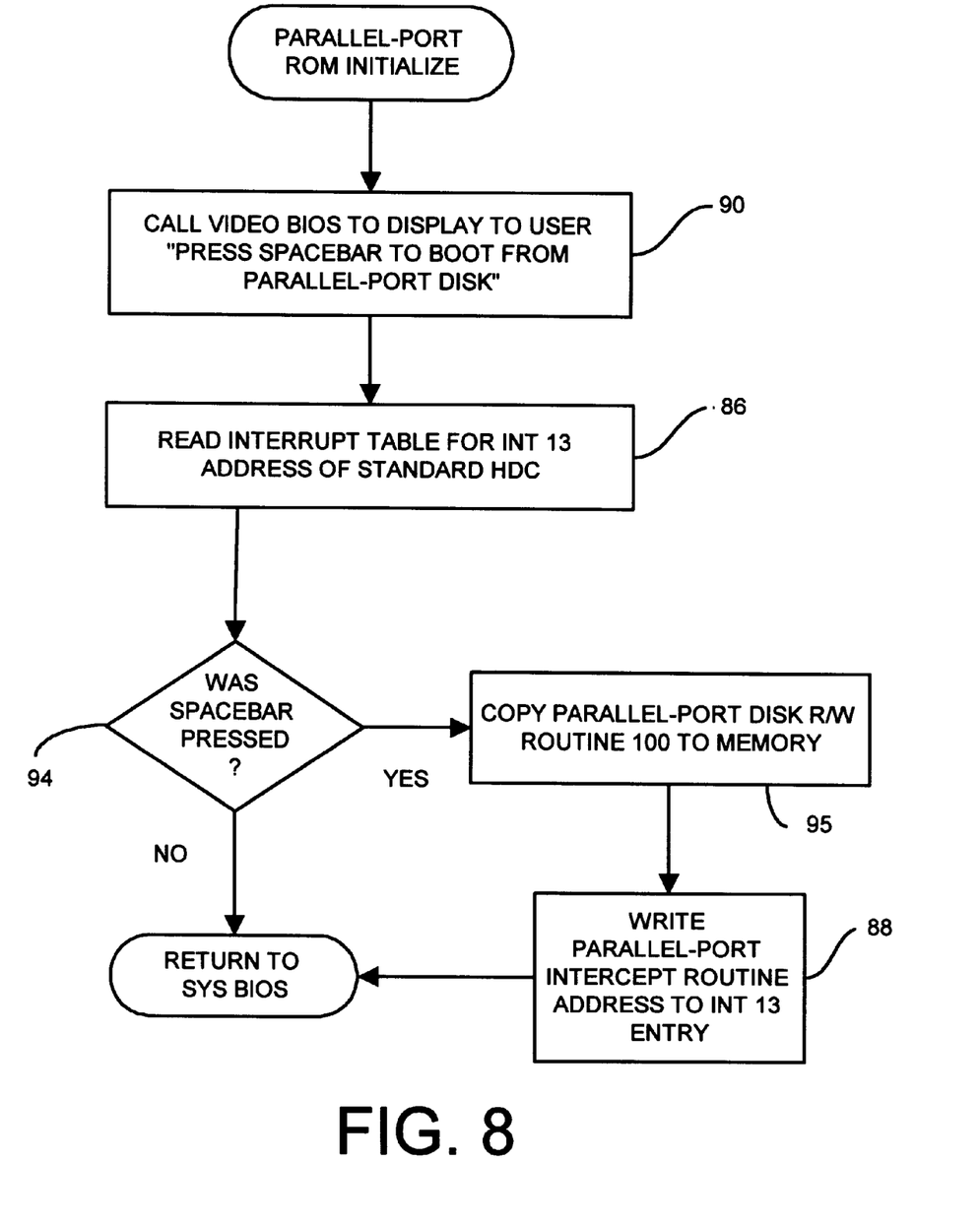
FIG. 8 is a flowchart of initialization of disk-write interception by the parallel-port ROM.

FIG. 8

FIG. 8 is a flowchart of initialization of disk-write interception by the parallel-port ROM. The video BIOS is called to display a message on the screen to the user, step 90. The message displayed is "PRESS SPACEBAR TO BOOT FROM THE PARALLEL PORT".

While waiting for the user to press the spacebar, the interrupt table's entry for interrupt 13, the hard-disk interrupt, is read for the starting address of the driver for the standard or primary hard disk, step 86.

The system BIOS is then consulted to determine if the user presses the spacebar key on the keyboard, step 94. If the user pressed the spacebar key, then (step 95) the parallel-port disk read/write routine (100 of FIG. 9A) is copied to memory at the address of the parallel-port intercept routine. The starting address of the parallel-port HDD intercept routine is written to the interrupt table's entry for interrupt 13, step 88. This starting address may be an address in parallel-port ROM 60 of FIG. 2, in which case address latch 46 needs to be read to determine which address the ROM is configured to respond to. The starting address is normally an address in main memory, because the parallel-port HDD intercept routine is loaded into memory rather than executed directly from ROM 60. Control is then returned to the system BIOS, which continues to scan for other expansion ROMs.

Figure 9A:
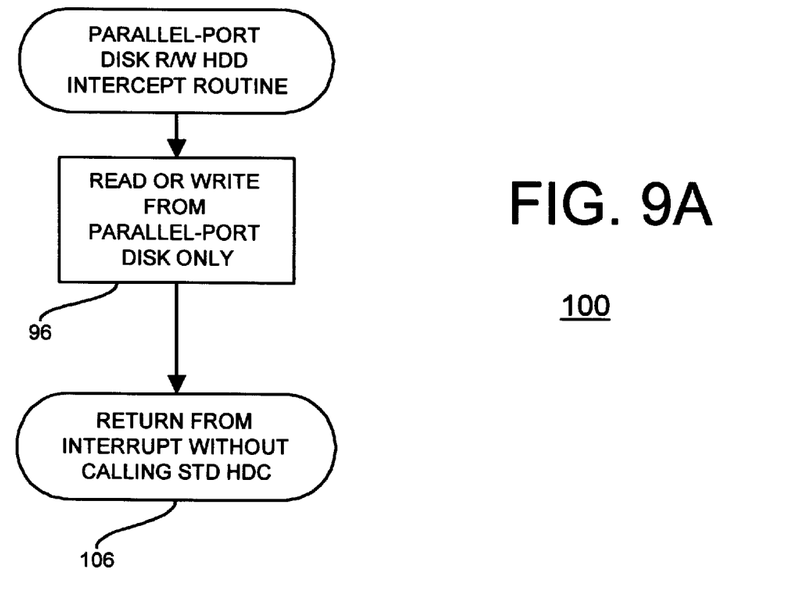
FIG. 9A is a flowchart of an intercept routine which boots from the redundant disk in an emergency, the parallel-port disk's read/write interrupt routine.

Thus the new target of the interrupt 13 vector written by step 88 is routine 100 of FIG. 9A. The parallel-port read/write routine intercepts reads as well as writes, and does not use the primary disk at all. This is useful when the primary disk has a catastrophic failure and the redundant disk must be used.

When the user did not press the spacebar, then the user does not want to boot from the parallel-port disk. The system is booted from the internal disk. The internal disk's config-.sys file causes the RAID shadow-write routine 101 (FIG. 9B) to be loaded. In step 116 of FIG. 7, the hard-disk interrupt entry in the interrupt table is over-written by an entry pointing to routine 101. Thus all writes to the internal hard disk are first intercepted by the RAID parallel-port routine 101. All future writes are thus mirrored to the parallel-port disk. The parallel-port disk is used as a redundant (RAID) disk.

Thus one of two routines is copied to the target address of interrupt 13: either the parallel-port read/write routine 100, or the parallel-port write-only routine 101.

Intercept Routine for Parallel-Port Redundant Disk

Figure 9B:
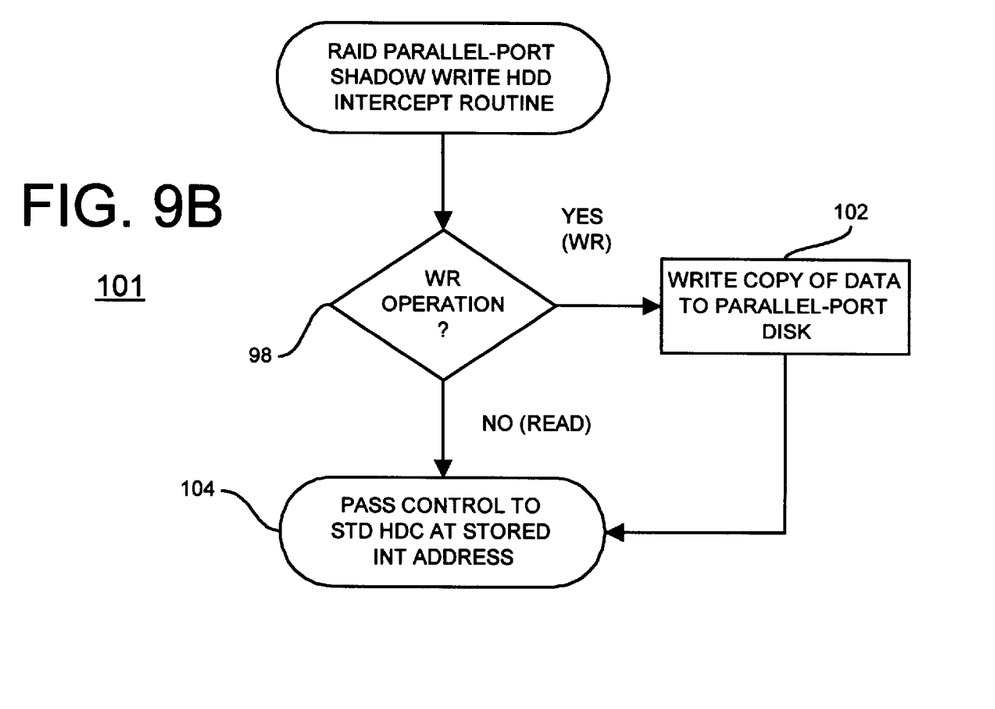
FIG. 9B is a flowchart of an intercept routine which mirrors writes to the primary hard disk to the redundant disk on the parallel port, the RAID parallel-port shadow write HDD interrupt routine.

FIG. 9

FIG. 9A is a flowchart of an intercept routine which boots from the redundant disk in an emergency, the parallel-port disk's read/write interrupt routine. If the user pressed the spacebar key when requested on boot-up, the parallel-port ROM initialization routine of FIG. 8 loaded routine 100 to the parallel-port interrupt routine's address space. The parallel-port ROM initialization thus replaced the starting address for interrupt 13 with the starting address for intercept routine 100 of FIG. 9A. Therefore all disk operations which use interrupt 13 cause intercept routine 100 to be executed.

Anytime the operating system or a program requests a disk operation by calling interrupt 13, the interrupt table is read for the starting address of the service routine for interrupt 13. The replaced starting address jumps to parallel-port intercept routine 100 which begins execution.

Because the target address of the hard-disk interrupt 13 was replaced, the parallel-port disk read/write HDD interrupt routine 100 sends all disk operations to the redundant disk over the parallel port, step 96. The redundant disk operates as the primary disk. The primary hard disk in the PC is not used at all. Thus control is passed directly back to the system BIOS, step 106, without calling the standard interrupt service routine for accessing primary hard disk 56.

Using redundant disk 42 on the parallel port as the main disk allows the boot sector and operating system to be loaded from redundant disk 42 rather than from primary hard disk 56. Booting from redundant disk 42 is useful when a catastrophic failure has occurred on primary hard disk 56. All operations to primary hard disk 56, and to hard-disk controller 52 in the PC's chassis are avoided when the parallel-port uses the read/write routine or software driver. A restore program can then be used to copy files from the parallel-port disk to the internal disk.

FIG. 9B is a flowchart of an intercept routine which mirrors writes to the primary hard disk to the redundant disk on the parallel port, the RAID parallel-port shadow write HDD interrupt routine. If the user did not press the spacebar key when requested on boot-up, the operating system's config.sys file loaded routine 101 from the internal hard disk while routine 100 is not loaded. The starting address for interrupt 13 was thus replaced with the starting address for intercept routine 101 of FIG. 9B. Therefore all disk operations which use interrupt 13 cause intercept routine 101 to be executed when loaded.

Only writes are shadowed or copied to the parallel-port disk when in redundant or RAID mode. Step 98 tests for disk-write requests. Disk reads and other operations do not have to be mirrored to the redundant hard disk, and control can be passed to the standard interrupt service routine for interrupt 13. The starting address from the interrupt table which was replaced is used as the jump address. The standard interrupt service routine then accesses primary hard disk 56 through the PC's standard HDC 52 of FIG. 1.

When step 98 determines that a write is requested to the hard disk, a copy of the data is written (step 102) to the parallel port and then to redundant disk 42 of FIG. 3. Control is then returned to the standard interrupt service routine, step 104, to write the data to the primary hard disk. Other operations such as seeks which position the disk's recording head are also transmitted to the redundant disks. Even read operations can be transmitted if the data read from the redundant disk is discarded.

Auto-Configuration of ROM Address

Figure 10:
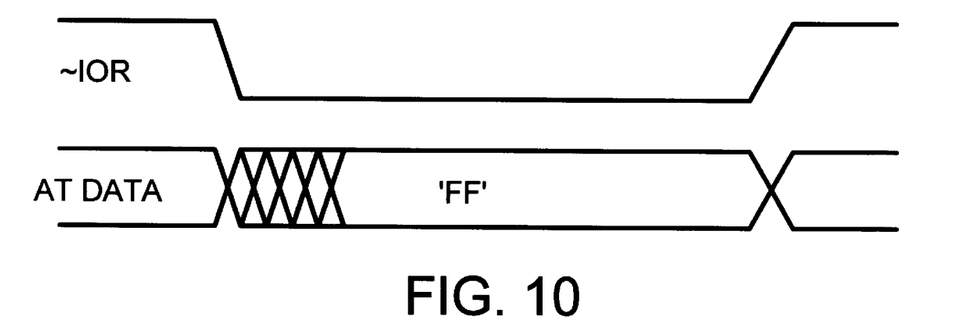
FIG. 10 is a waveform diagram of the system BIOS scanning an address for an expansion ROM when no ROM is present at the scanned address.
Figure 11:
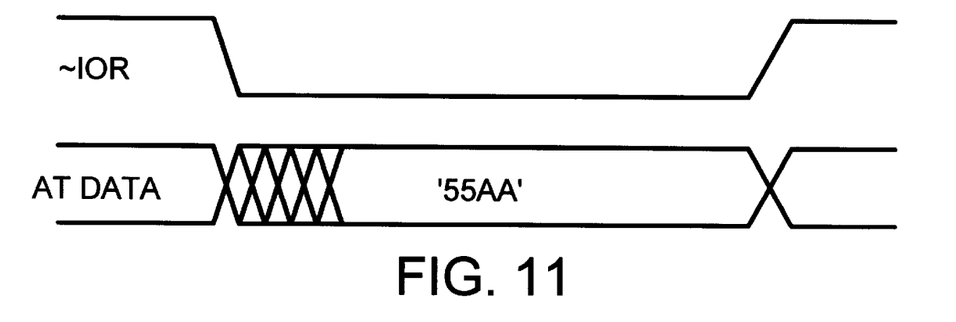
FIG. 11 is a waveform diagram of the system BIOS scanning an address for an expansion ROM when a ROM is present.
Figure 12:
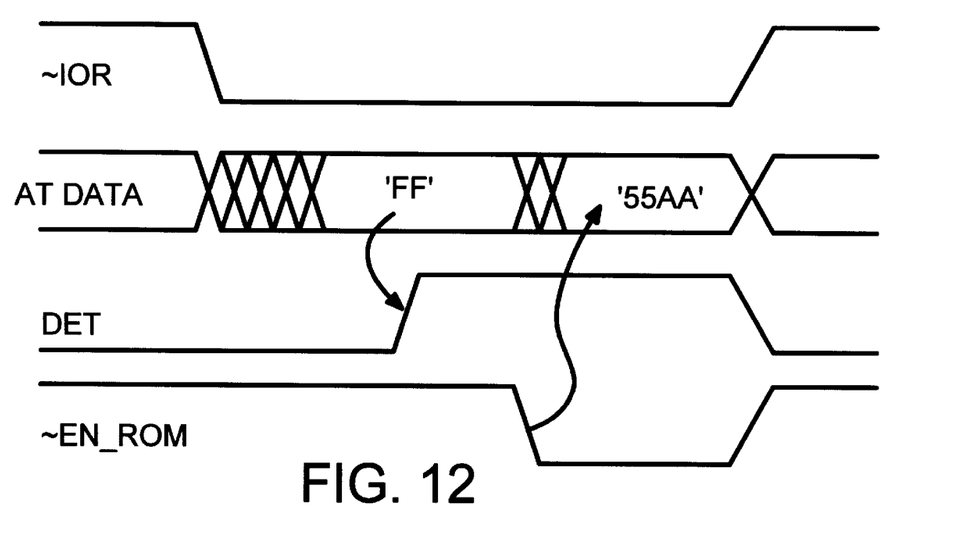
FIG. 12 is a waveform diagram of the system BIOS scanning for an expansion ROM at an empty address which is auto-configured for the parallel-port ROM.

FIGS. 10, 11, 12

FIG. 10 is a waveform diagram of the system BIOS scanning an address for an expansion ROM when no ROM is present at the scanned address. The system BIOS executes an I/O read cycle at an address in the expansion ROM area from C8000 to DFFFF hex. The CPU and AT-bus logic generate an I/O read pulse (~IOR). Since no ROMs or other devices respond to the address in this example, no drivers actively drive the bus high or low. The default data "FF" is left on the AT data bus. The default data is "FF" because of pull-up resistors on the data signals of the AT bus.

FIG. 11 is a waveform diagram of the system BIOS scanning an address for an expansion ROM when a ROM is present. The system BIOS executes an I/O read cycle at an address in the expansion ROM area from C8000 to DFFFF hex. The CPU and AT-bus logic generate an I/O read pulse (~IOR). After delays for the address decoder to decode the address, and for the ROM to access its data, the ROM drives its data onto the AT data bus. The system BIOS scans from lower address to larger addresses at fixed intervals of 2 K bytes searching for a ROM. The first address encountered in a ROM is in the ROM's header. Headers have a fixed data pattern: "55AA" Hex. Thus the AT data bus is driven with "55AA" when a ROM is found at the scanned address.

The system BIOS does not continue scanning when the ROM's header is found. Instead, control is transferred to that ROM. The ROM returns its size to the system BIOS, allowing the system BIOS to skip over addresses in the ROM. Scanning then continues with addresses after the end of the found ROM.

FIG. 12 is a waveform diagram of the system BIOS scanning for an expansion ROM at an empty address which is auto-configured for the parallel-port ROM. The system BIOS executes an I/O read cycle at an address in the expansion ROM area from C8000 to DFFFF hex. The CPU and AT-bus logic generate an I/O read pulse (~IOR). Since no ROMs or other devices respond to the address in this example, no drivers actively drive the bus high or low. The default data "FF" is left on the AT data bus.

When FF detector 45 of FIG. 2 detects the AT data bus having the default FF data, and decoder 28 signals a valid cycle for addresses C8000 to DFFFF, DET signal 44 is activated after a predetermined delay. This predetermined delay is preferably determined by a number of clock cycles after the I/O read signal is asserted. The predetermined delay allows enough time for other ROMs to decode the address and drive data to the AT bus. The pre-determined delay depends on the speed of the AT bus. A typical delay for an 8 MHz AT bus is 125 nanoseconds.

DET signal 44 causes the current address to be latched into latch 46 as the auto-configured address of the parallel-port ROM. Latch 46 can be enabled by a system reset signal so that it can only be loaded once—not re-loaded by accident after the system BIOS scan.

Latching the address into latch 46 causes a ROM enable or select signal ~EN_ROM to be asserted, enabling the ROM for access. Parallel-port ROM 60 responds to the newly-configured address by driving data onto the AT data bus. The data driven is the ROM's header. "55AA". The system BIOS reads the header data and determines that an expansion ROM is present at the scanned address, and executes am initialization routine for the ROM.

The parallel-port ROM must be fast enough to drive the header data onto the AT data bus even when half of the I/O read cycle is used for detection and latching the address. Since the original timing for the AT bus was chosen many years ago when ROMs were much slower, today's ROMs are fast enough to be read in only half of a normal I/O read cycle. An alternative is to extend the I/O read cycle by requesting a wait state by asserting the IORDY signal or to have other logic on the parallel-port card drive "55AA" when DET is asserted, rather than use the ROM.

Advantages of the Invention

When the parallel-port disk is initialized as the primary disk, the intercept routine intercepts reads as well as writes, and does not use the primary disk at all. This is useful when the primary disk has a catastrophic failure and the redundant disk must be used. It is also useful when a system administrator wishes to upgrade a user's PC. The system administrator can transport the external parallel device with the redundant disk to the user's PC, and then boot from the redundant disk and copy any files over to a newly-installed hard disk.

The invention allows the expansion ROM to be automatically configured. The AT card's logic detects an unused address in the expansion ROM region, and configures the card to respond to this address. The user does not have to manually change jumpers on the card to configure the address, or to be concerned with which addresses are available. The invention cooperates with other expansion devices, allowing them to use any address. Even when a new expansion card is added months or years after the parallel-port card is added, the parallel-port card simply chooses a different address when a conflict exists.

Alternate Embodiments

Several other embodiments are contemplated by the inventors. For example additional buses such as the PCI bus can be used rather than just the AT bus. The parallel-port card could be connected to these other buses, or to both the PCI and the AT bus. Other logic implementations are possible, and many alternative software routines could be devised which still fall within the spirit of the invention.

For optimum compatibility with 32-bit operating systems such as Windows/NT, a 32-bit version of the parallel-port boot driver is used which traps all accesses to the 32-bit disk drivers to take over as the boot drive.

While PC's were originally manufactured by International Business Machines (IBM) of Armonk, N.Y., many vendors now make PC's in an intensely competitive market. The invention can be applied to many types of PC's such as clones. Some of today's "readonly" memories (ROM's) are writeable, such as EEPROM's and flash memories which allow code updates.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A parallel-port adapter card for installation on an expansion bus on a personal computer (PC), the expansion bus having a host data bus and a host address bus, the parallel-port adapter card comprising:
   a connector for connecting to a parallel cable;
   a control register coupled to the host data bus, for driving control signals to the connector;
   a data register coupled to the host data bus, for sending and receiving data signals from the connector;
   a status register coupled to the host data bus, for receiving status signals from the connector;
   a read-only-memory (ROM) coupled to transmit ROM code to the host data bus on the expansion bus, the ROM code including:
      table read means for reading a disk-interrupt starting address from an interrupt table, the disk-interrupt starting address pointing to a disk service routine for accessing a hard disk; and
      table write means for over-writing the disk-interrupt starting address in the interrupt table with an intercept starting address, the intercept starting address pointing to a parallel-port service routine for writing to the data register and the control register;
   wherein the parallel-port service routine includes:
      means for writing disk data to the data register for transmission through the connector over the parallel cable to an external redundant hard disk; and
      return means for returning program control to the disk service routine, wherein the disk service routine writes the disk data to the hard disk,
   whereby the external redundant hard disk is written with a copy of the disk data written to the hard disk when a program writes to the hard disk using the interrupt table and whereby the parallel-port adapter card has the ROM containing ROM code for over-writing the disk-interrupt starting address in the interrupt table.

2. The parallel-port adapter card of claim 1 wherein the disk-interrupt starting address which is over-written in the interrupt table is a starting address for interrupt 13.

3. The parallel-port adapter card of claim 1 further comprising:
   a ROM-address latch for storing a ROM address, the ROM transmitting the ROM code when the ROM address is transmitted on the host address bus.

4. The parallel-port adapter card of claim 2 wherein the ROM code is activated by a system BIOS residing in a system ROM in the PC during a booting sequence.

5. The parallel-port adapter card of claim 3 further comprising:
   default-data detect means, coupled to the host data bus, for activating a latch signal when no active devices are driving the host data bus during a scan cycle, the latch signal coupled to store address bits from the host address bus into the ROM-address latch, the address bits determining the ROM address,
   whereby the ROM address is latched when no active devices are driving the host data bus during a scan cycle.

6. The parallel-port adapter card of claim 5 wherein the address bits stored as the ROM address in the ROM-address latch are fewer than all the address bits on the host data bus, wherein the ROM address is a range of addresses containing the ROM code.

7. The parallel-port adapter card of claim 6 wherein the scan cycle is a read cycle in an expansion ROM area between addresses C8000 and DFFFF hex.

8. A method for re-starting a personal computer (PC) comprising the computer-implemented steps of:
   fetching instructions from a system ROM to a microprocessor for execution;
   writing an interrupt table in a memory, the interrupt table containing entries for various types of system interrupts including an entry for a hard-disk interrupt;
   reading instructions from a video ROM to initialize a display;
   reading addresses in an expansion ROM area to locate any expansion ROMs;
   detecting a parallel-port expansion ROM when reading addresses in the expansion ROM area; and
   fetching and executing instructions from the parallel-port expansion ROM including instructions to over-write the entry in the interrupt table for the hard-disk interrupt with a new pointer address to an intercept routine,
   the intercept routine:
      writing disk data to a data register for transmission through a connector over a parallel cable to an external redundant hard disk; and
      returning program control to a disk service routine, wherein the disk service routine writes the disk data to the hard disk, whereby the external redundant hard disk is written with a copy of the disk data written to the hard disk when a program writes to the hard disk using the interrupt table and whereby the entry for the hard-disk interrupt is replaced by the new pointer address to the intercept routine when the parallel-port expansion ROM is located during re-starting of the PC.

9. The method of claim 8 further comprising the computer-implemented step of:

reading from the interrupt table and storing an original pointer address to a hard-disk service routine for reading and writing to a primary hard disk on the PC.

10. The method of claim 9 further comprising the computer-implemented steps of:

displaying a query to a user asking if the user desired to boot from an external hard disk connected to the parallel port rather than from the primary hard disk on the PC; and loading a parallel-port read and write routine when the user indicates to boot from the external hard disk, whereby the user is asked whether to boot from the external hard disk on the parallel port or from the primary hard disk.

11. The method of claim 9 further comprising the computer-implemented steps of:

when a disk read is requested by a calling program generating the hard-disk interrupt:

reading the new pointer address from the entry for the hard-disk interrupt in the interrupt table;

passing program control to the intercept routine at the new pointer address;

copying write data to an external hard disk through a parallel port;

calling the hard-disk service routine at the original pointer address, the hard-disk service routine writing the write data to the primary hard disk, whereby a redundant copy of the write data is written to the external hard disk on the parallel port when the hard-disk interrupt is called to write to the primary hard disk.

12. The method of claim 10 further comprising the computer-implemented step of:

reading a boot sector from the primary hard disk when the parallel-port read and write routine is not loaded, but reading the boot sector from the external hard disk when the parallel-port read and write routine is loaded, whereby the boot sector is read from the external hard disk or from the primary hard disk.

13. The method of claim 11 wherein the steps of reading addresses in an expansion ROM area and detecting the parallel-port expansion ROM comprises:

detecting when no devices are driving a data bus on the PC by detecting a default data value;

storing address bits from an address bus when the default data value is detected, the address bits indicating a range of addresses which read code from the parallel-port expansion ROM; and driving header data onto the data bus when the address bits are stored, before the end of a single read cycle in the expansion ROM area, whereby the address of the parallel-port expansion ROM is configured by detecting the default data value.

14. The method of claim 12 further comprising the computer-implemented steps of:

when a disk read is requested by a calling program generating the hard-disk interrupt:

reading the new pointer address from the entry for the hard-disk interrupt in the interrupt table;

passing program control to the intercept routine at the new pointer address;

when the parallel-port read and write routine is loaded:

reading or writing from the external hard disk;

returning control to the calling program without executing the hard-disk service routine and without accessing the primary hard disk;

when the parallel-port read and write routine is not loaded:

copying write data to the external hard disk through a parallel port;

calling the hard-disk service routine at the original pointer address, the hard-disk service routine writing the write data to the primary hard disk, whereby the external hard disk on the parallel port is read rather than the primary hard disk when the hard-disk interrupt is called when the parallel-port read and write routine is loaded.

15. A personal computer (PC) comprising:

a microprocessor for executing instructions;

an expansion bus, coupled to be read by the microprocessor, for installing expansion cards therein, the expansion bus having a host data bus and a host address bus;

a system ROM containing a system BIOS for re-initializing the PC during a booting sequence;

a parallel-port expansion card comprising:

a connector for connecting to a parallel cable;

a control register, a data register, and a status register, coupled to the host data bus, for communicating to an external parallel-port device connected by a parallel cable to the connector;

a read-only-memory (ROM) coupled to transmit ROM code to the host data bus on the expansion bus, the ROM code including:

table read means for reading a disk-interrupt starting address from an interrupt table, the disk-interrupt starting address pointing to a disk service routine for accessing a hard disk; and table write means for over-writing the disk-interrupt starting address in the interrupt table with an intercept starting address, the intercept starting address pointing to a parallel-port service routine for writing to the data register and the control register;

wherein the parallel-port service routine includes:

means for writing disk data to the data register for transmission through the connector over the parallel cable to an external redundant hard disk; and return means for returning program control to the disk service routine, wherein the disk service routine writes the disk data to the hard disk, whereby the external redundant hard disk is written with a copy of the disk data written to the hard disk when a program writes to the hard disk using the interrupt table and whereby the parallel-port expansion card has the ROM containing ROM code for over-writing the disk-interrupt starting address in the interrupt table.

16. The personal computer of claim 15 wherein the disk-interrupt starting address which is over-written in the interrupt table is a starting address for interrupt 13.

17. The personal computer of claim 16 wherein the parallel-port expansion card is removable from the expansion bus of the PC.

18. The personal computer of claim 17 wherein the parallel-port expansion card further comprises:

a ROM-address latch for storing a ROM address, the ROM transmitting the ROM code when the ROM address is transmitted on the host address bus;

default-data detect means, coupled to the host data bus, for activating a latch signal when no active devices are driving the host data bus during a scan cycle, the latch signal coupled to store address bits from the host address bus into the ROM-address latch, the address bits determining the ROM address, whereby the ROM address is latched when no active devices are driving the host data bus during a scan cycle.

* * * * *